(12) United States Patent
Tsuchiya et al.

(10) Patent No.: US 8,418,723 B2
(45) Date of Patent: Apr. 16, 2013

(54) ELECTROMAGNETIC PROPORTIONAL FLOW RATE CONTROL VALVE

(75) Inventors: Hideki Tsuchiya, Tokyo (JP); Yoshiharu Miya, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 854 days.

(21) Appl. No.: 10/494,568

(22) PCT Filed: Dec. 9, 2002

(86) PCT No.: PCT/JP02/12848
§ 371 (c)(1),
(2), (4) Date: Oct. 27, 2004

(87) PCT Pub. No.: WO03/050441
PCT Pub. Date: Jun. 19, 2003

(65) Prior Publication Data
US 2005/0035320 A1 Feb. 17, 2005

(30) Foreign Application Priority Data

Dec. 11, 2001 (JP) ................................. 2001-376987
Dec. 20, 2001 (JP) ................................. 2001-387055

(51) Int. Cl.
*F16K 31/06* (2006.01)
(52) U.S. Cl.
USPC ............ 137/625.65; 251/129.02; 251/129.08; 251/284
(58) Field of Classification Search ............. 251/129.15, 251/129.02, 129.08, 284; 137/625.65
See application file for complete search history.

(56) References Cited

U.S. PATENT DOCUMENTS

| | | | |
|---|---|---|---|
| 5,467,962 A * | 11/1995 | Bircann et al. | 251/129.15 |
| 5,588,414 A * | 12/1996 | Hrytzak et al. | 251/129.15 |
| 5,645,097 A * | 7/1997 | Zechmann et al. | 251/129.01 |
| 5,649,748 A * | 7/1997 | Oehler et al. | 251/129.02 |

(Continued)

FOREIGN PATENT DOCUMENTS

| | | |
|---|---|---|
| DE | 40 41 377 | 12/1990 |
| DE | 196 04 317 | 8/1997 |

(Continued)

OTHER PUBLICATIONS

Foreign Office Action of 02824804X, Apr. 20, 2007, Kayaba Industry Co., LTD, p. 1.

(Continued)

*Primary Examiner* — John Bastianelli
(74) *Attorney, Agent, or Firm* — Rabin & Berdo, P.C.

(57) ABSTRACT

An electromagnetic proportional flow rate control valve capable of performing precise flow rate control in a low flow rate side of an operating region is provided. In an electromagnetic proportional flow rate control valve 32, in which a valve member 2 is driven in a valve closing direction in accordance with the increase in a driving current I of a solenoid coil 15, a solenoid driving force F is set such that it decreases accompanying the displacement of the valve member 2 in the valve closing direction with respect to an identical driving current in the solenoid coil 15. Thus, an amount of change in an area of a valve opening with respect to unit changes in the driving current I becomes smaller in a region at which the stroke is small compared to a case of having flat characteristics, whereby the flow rate control precision in the low flow rate region can be improved.

2 Claims, 6 Drawing Sheets

U.S. PATENT DOCUMENTS

| | | | | |
|---|---|---|---|---|
| 5,687,698 | A * | 11/1997 | Mastro et al. | 251/129.15 |
| 5,813,654 | A * | 9/1998 | Hopley | 251/129.16 |
| 5,868,108 | A * | 2/1999 | Schmitz et al. | 251/129.01 |
| 5,947,092 | A * | 9/1999 | Hussey et al. | 251/129.15 |
| 6,000,379 | A * | 12/1999 | Stockner et al. | 251/129.18 |
| 6,092,781 | A * | 7/2000 | Hohl et al. | 251/129.02 |
| 6,247,766 | B1 * | 6/2001 | Subramanian et al. | 303/119.2 |
| 6,254,199 | B1 * | 7/2001 | Megerle et al. | 251/129.02 |
| 6,315,268 | B1 * | 11/2001 | Cornea et al. | 251/129.15 |
| 6,394,414 | B1 * | 5/2002 | Breitling et al. | 251/129.04 |
| 6,619,612 | B2 * | 9/2003 | Freisinger et al. | 251/129.17 |
| 6,675,751 | B1 * | 1/2004 | Megli et al. | 251/129.1 |
| 6,681,728 | B2 * | 1/2004 | Haghgooie et al. | 251/129.1 |
| 6,755,166 | B2 * | 6/2004 | Chang et al. | 251/129.07 |
| 2002/0134355 | A1 * | 9/2002 | Boehm et al. | 123/458 |
| 2003/0051688 | A1 * | 3/2003 | Chang et al. | 123/90.26 |

FOREIGN PATENT DOCUMENTS

| | | |
|---|---|---|
| DE | 196 40 897 | 2/1998 |
| DE | 10023621 A1 * | 11/2001 |
| EP | 822362 | 2/1998 |
| JP | 54-15623 | 7/1979 |
| JP | 57-65273 | 10/1982 |
| JP | 61-1697 | 1/1986 |
| JP | 61-1697 | 1/1988 |
| JP | 02-173485 | 7/1990 |
| JP | 03-60663 | 6/1991 |
| JP | 04-151080 | 5/1992 |
| JP | 04-157270 | 5/1992 |
| JP | 06-011067 | 1/1994 |
| JP | 07-151257 | 6/1995 |
| JP | 10-505893 | 6/1998 |
| JP | 11-118063 | 4/1999 |
| JP | 2001-163233 | 6/2001 |

OTHER PUBLICATIONS

Foreign Office Action of 102 97 516.7-12 with translation, Sep. 24, 2007, Kayaba Industry Co., Ltd.

* cited by examiner

S (STROKE) - F (DRIVING FORCE) CHARACTERISTIC

*I* (CURRENT) – *F* (DRIVING FORCE) CHARACTERISTIC

*I* (CURRENT) – *Qc* (CONTROL FLOW RATE) CHARACTERISTIC

*I* (CURRENT) – *F* (DRIVING FORCE) CHARACTERISTIC

*I* (CURRENT) – *Qc* (CONTROL FLOW RATE) CHARACTERISTIC

ELECTROMAGNETIC PROPORTIONAL FLOW RATE CONTROL VALVE

TECHNICAL FIELD

This invention relates to an improvement of an electromagnetic proportional flow rate control valve used for power steering apparatuses of automobiles, industrial machines, and the like.

BACKGROUND ART

The device disclosed in Japanese Patent Application Laid-open No. 2001-163233, for example, is a conventional electromagnetic proportional flow rate control valve used for power steering apparatuses.

In the electromagnetic flow rate control valve described above, as shown by dashed lines in FIG. 3, a driving force of a solenoid for driving a valve member is set to have flat characteristics so that the solenoid driving force becomes uniform over nearly an entire region of a valve stroke with respect to an identical driving current.

In general, as shown by double dashed lines in FIG. 3, the solenoid driving force sharply increases on an adsorption side in accordance with a valve stroke with respect to an identical driving current. However, since control characteristics of the valve become complex in this case, the solenoid driving force is set so as to have flat characteristics, thereby being capable of making control of a valve-opening degree easier.

However, even if the solenoid driving force is set to have flat characteristics, between the driving current that flows in a solenoid coil and the solenoid driving force, there is such a relationship that the solenoid driving force becomes relatively large with respect to a change in a unit current value in a region where the current value becomes large. This is because the solenoid driving force is proportional to the square of the current value. The extent of change in the solenoid driving force therefore gradually becomes larger with respect to the same amount of change in the current, as shown in FIG. 3.

As a result, as shown by a dashed line in FIG. 4, the extent of the change in the solenoid driving force with respect to an identical amount of change in current becomes larger in the region where the value of the solenoid driving current is large, compared with a region where the current value is small.

The degree of opening of the valve generally becomes a maximum in a state at which the driving current is zero in the electromagnetic proportional flow rate control valve, and the degree of opening thereof decreases along with the increase in the driving current. That is, the control amount is set so as to decrease in accordance with the increase in the driving current.

The flow rate to be controlled, therefore, had a tendency to change sharply with respect to a slight change in the driving current in the region where the opening degree of the electromagnetic proportional control valve is small. A problem consequently developed in that accurate flow rate control becomes difficult in a low flow rate region where the flow rate to be controlled is small.

An object of this invention is to provide an electromagnetic proportional flow rate control valve capable of performing flow rate control with high precision in the low flow rate control region.

DISCLOSURE OF THE INVENTION

According to the present invention, a solenoid driving force with respect to a valve stroke is given such characteristics that there is a drop off on an adsorption side for an identical driving current, that is, a valve opening degree is made smaller. Thus, compared with a case of flat characteristics described above, an amount of change in an area of the valve opening is small with respect to unit changes in the driving current in a region where the stroke of the valve member is short, with the result that flow rate control precision is increased in a low flow rate control region.

Further, according to the present invention, the electromagnetic proportional flow rate control valve is structured such that the proportion of reduction in the area of the opening of a variable orifice gradually becomes smaller with respect to the valve stroke as the valve member approaches a valve seat. Thus, the flow rate control precision is increased in the low flow rate control region.

BEST MODE FOR CARRYING OUT THE INVENTION

An embodiment of this invention will be described hereinbelow with reference to the drawings.

Figure 1:
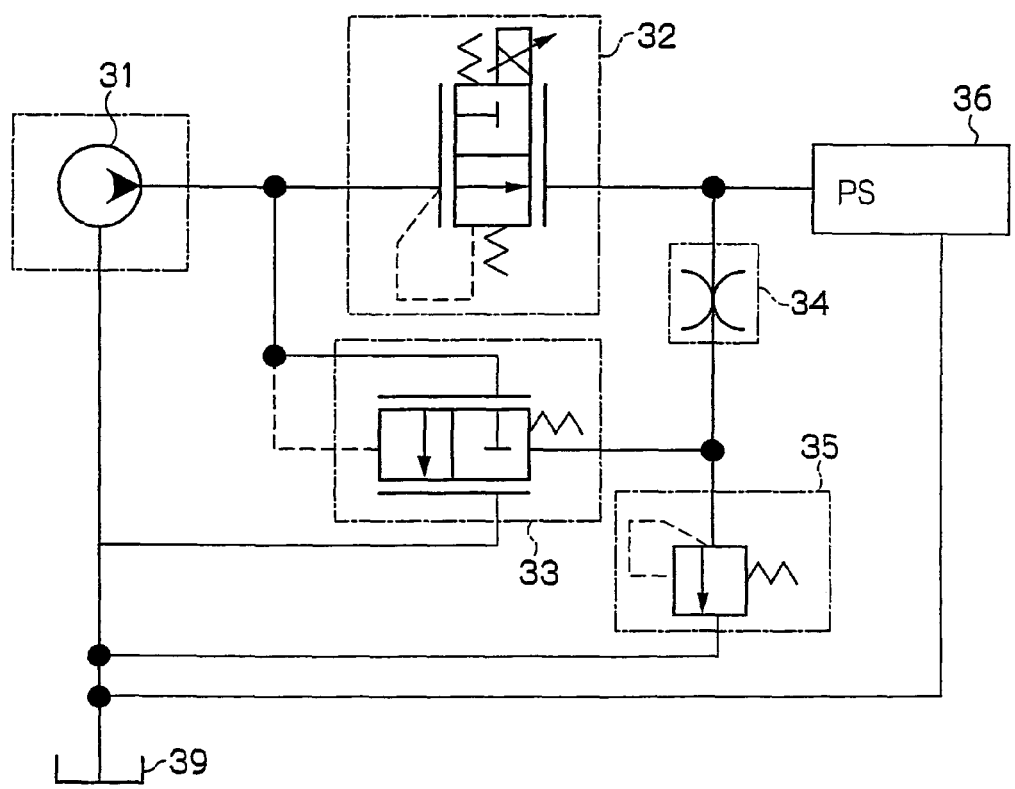
FIG. 1 is a hydraulic circuit diagram of a power steering apparatus according to this invention.

FIG. 1 is a hydraulic circuit diagram of a power steering apparatus for automobiles.

Reference numeral 31 denotes a pump. Hydraulic oil discharged from the pump 31 is supplied to a power steering system 36 for assisting steering operations in an automobile. An electromagnetic proportional flow rate control valve 32 is provided in order to control the flow rate of the hydraulic oil supplied to the power steering system 36.

The flow rate of the hydraulic oil controlled by the electromagnetic proportional flow rate control valve 32 is proportional to the valve opening degree of the electromagnetic proportional flow rate control valve 32, and to a pressure difference between an upstream and downstream of the valve. Accordingly, if the pressure difference is constant, the flow rate is changed depending upon solely the opening degree of the valve 32. Accordingly, in order to obtain a flow rate that is proportional to the opening degree of the electromagnetic proportional flow rate control valve 32, a pressure compensating valve 33 is provided upstream of the electromagnetic proportional flow rate control valve 32. The pressure compensating valve 33 serves to substantially maintain a certain pressure difference $\Delta P$ ($=P_1-P_2$) in the hydraulic circuit between the upstream and downstream of the electromagnetic proportional flow rate control valve 32.

If the pressure difference becomes larger than a set value, the pressure compensating valve 33 releases a portion of the hydraulic oil from the upstream of the electromagnetic proportional flow rate control valve 32 to a reservoir 39, thereby lowering the pressure on the upstream side thereof to maintain the pressure difference into the set value. Contrary to this, if the pressure difference becomes smaller than the set value, the pressure compensating valve 33 reduces the amount of hydraulic oil to be released from the upstream of the electromagnetic proportional flow rate control valve 32 to the reservoir 39, thereby increasing the pressure on the upstream side thereof to maintain the pressure difference into the set value.

Reference numeral 34 denotes an orifice, and reference numeral 35 denotes a high pressure relief valve. The relief valve 35 determines a maximum pressure of the hydraulic oil to be supplied to the power steering system 36, and therefore functions as a safety valve. The relief valve 35 opens, if the oil pressure is equal to or greater than a set pressure, to release the hydraulic oil from the upstream of the electromagnetic proportional flow rate control valve 32 to the reservoir 39. Further, the orifice 34 suppresses fluctuations in pressure; communicates with the pressure compensating valve 33; and contributes to operational stability.

In this power steering apparatus, during non-steering state in which a steering wheel is kept in the neutral position, a load pressure $P_2$ of the power steering system 36 is reduced, and the required flow rate of the hydraulic oil is also small. Consequently, the electromagnetic proportional flow rate control valve 32 maintains a minimum opening degree thereof. Only the minimum flow rate determined by the minimum opening degree thereof is supplied to the power steering system 36, and the control flow rate to be supplied to the power steering system 36 is lessened, thereby reducing the energy loss.

In contrast, the load pressure $P_2$ of the power steering system 36 becomes high during the steering operation, and the required hydraulic oil flow rate also becomes large. Accordingly, the opening degree of the electromagnetic proportional flow rate control valve 32 is also controlled so as to become large. With this, a flow rate Qc, which is controlled in accordance with the opening degree of the electromagnetic proportional flow rate control valve 32, is supplied to the power steering system 36, and a necessary power assisting force may be imparted thereto.

Figure 2:
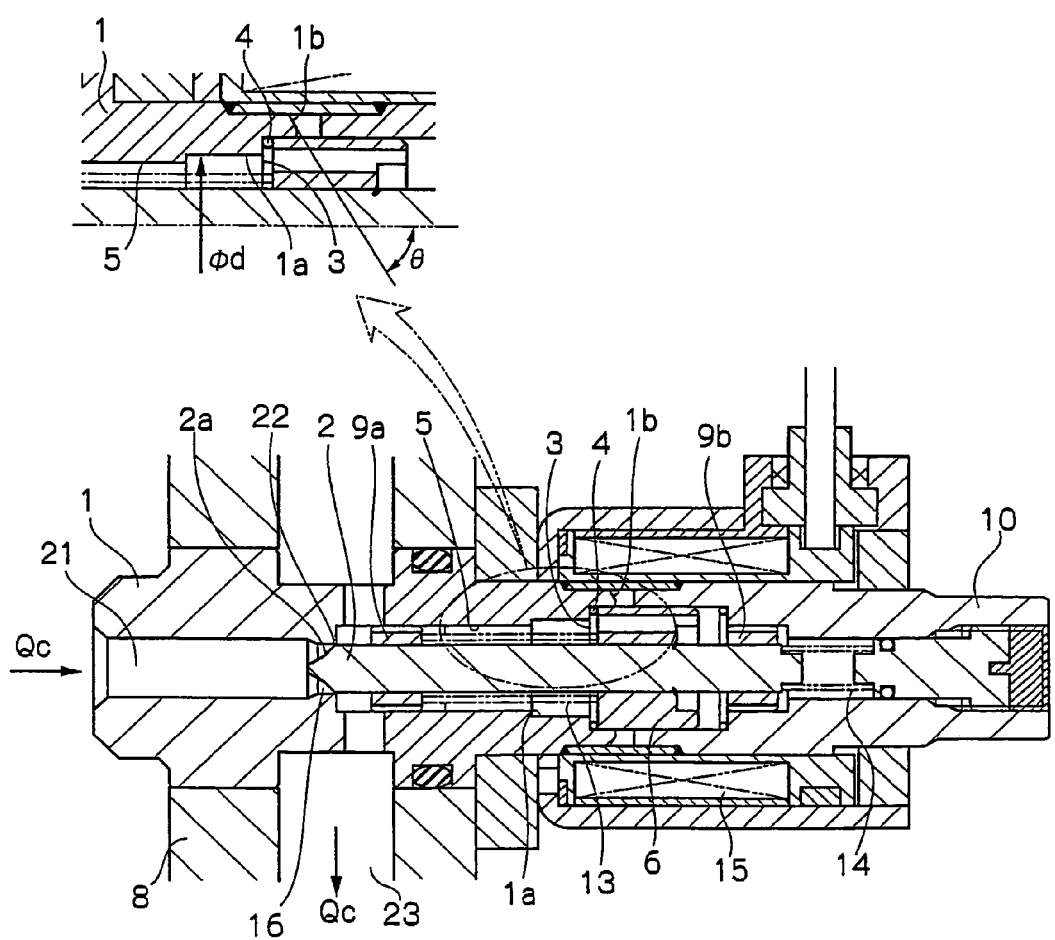
FIG. 2 is a cross sectional view showing an electromagnetic proportional flow rate control valve according to the present invention.

The specific structure of the electromagnetic proportional flow rate control valve 32 is shown in FIG. 2.

The electromagnetic proportional flow rate control valve 32 is provided with a cylindrical valve body 1 attached to a portion of a housing 8 of the pump 31 for supplying hydraulic oil, and a valve member 2 sidably inserted into an inner circumferential surface 5 of the valve body 1.

An upstream port 21 that is communicated to a discharge side of the pump 31; a valve seat 16 that forms a variable orifice 22 in association with the valve member 2; and a downstream port 23 that is communicated to a load side are formed in the valve body 1. Hydraulic fluid discharged from the pump 31 is allowed to flow to the load side through the upstream port 21, the variable orifice 22 (the valve seat 16), and the downstream port 23, as indicated by an arrow in the figure. That is, the hydraulic fluid flows to the power steering system 36.

The cylindrical valve member 2 is slidably supported by a pair of bearings 9a and 9b within the valve body 1 and a sleeve 10 coaxially coupled with the valve body 1.

A conical valve portion 2a is formed at a tip of the valve member 2, and the valve portion 2a is inserted into the valve seat 16. An area Av of the opening of the variable orifice 22 formed between the valve portion 2a and the valve seat 16 gradually becomes larger, accompanying displacement of the valve member 2 in a direction away from the valve seat 16 in the figure (a rightward direction in FIG. 2).

A spring 13 is provided for urging the valve member 2 in a direction away from the valve seat 16, i.e., a valve opening direction, and a spring 14 is provided for urging the valve member 2 in the opposite direction, i.e., a valve closing direction.

A plunger 6 is fixed to the middle of the valve member 2 as a movable core, and a solenoid coil 15 for driving the plunger 6 is disposed on the outside of the sleeve 10. The plunger 6 drives the valve member 2 in the valve closing direction by a solenoid driving force F of the solenoid coil 15. That is, the valve member 2 is displaced in a leftward direction in FIG. 2 against the spring force of the spring 13, in accordance with the increase in a driving current I flowing in the solenoid coil 15.

Specifically, the solenoid driving force F generated by the solenoid coil 15 acts on the valve member 2 in the valve closing direction. Opposing this, a differential force between the springs 13 and 14 (since the spring 13 works in the valve opening direction, and the spring 14 works in the valve closing direction, this differential force is a difference between the two spring forces, although the acting force of the spring 13 is set larger so that the overall force acts in the valve opening direction), a force generated due to the pressure difference $\Delta P$ between the pressures on the upstream and the downstream of the variable orifice 22, and a fluidic force that develops at the variable orifice 22 act on the valve member 2 in the valve opening direction. The valve member 2 moves to a position at which those forces are in balance. Thus, the area of the variable orifice 22, that is, the area Av of the opening of the valve member 2 is determined.

The state shown in FIG. 2 is one in which: the driving current with respect to the solenoid coil 15 is large; the valve member 2 is displaced to the maximum and can not be displaced any further, because the plunger 6 is brought into contact with an inner circumferential step portion 3 of the valve body 1, which is an adsorption portion, through a ring 4; and the area Av of the valve opening is the minimum. Note that as discussed later, in this state valve stroke is zero (stroke S=0), to the contrary the driving current I with respect to the solenoid valve 15 is zero and the valve is maintained at a maximum opening degree thereof by the spring force, is defined as a maximum stroke state in this specification.

Figure 3:
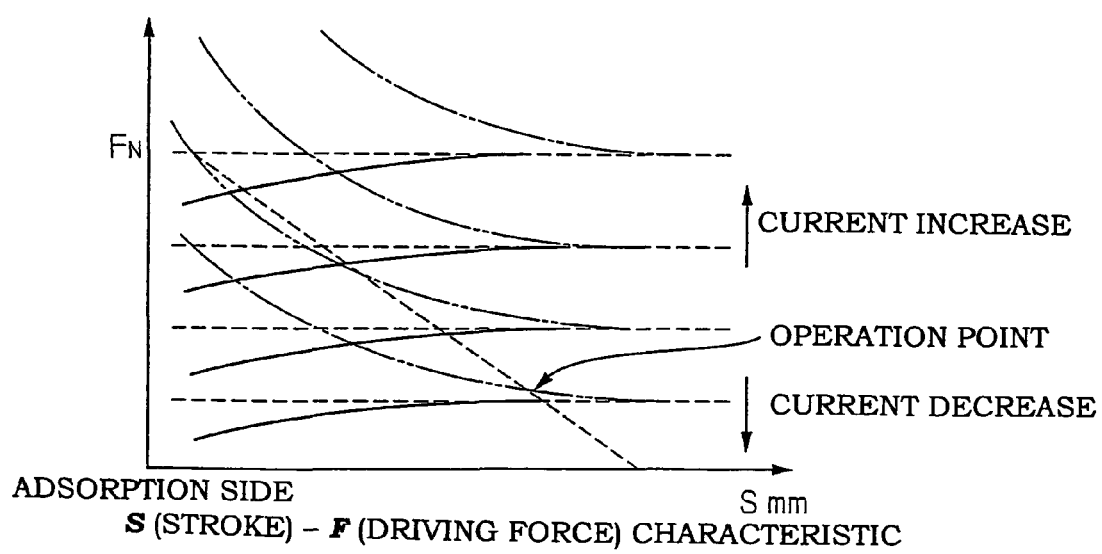
FIG. 3 is a characteristic diagram showing a relationship between a valve stroke and a solenoid driving force in the electromagnetic proportional flow rate control valve according to the present invention.

In the present invention, the relationship between the solenoid driving force F of the solenoid coil 15 acting on the valve member 2 and the stroke S of the valve member 2 is set so as to be the one shown in FIG. 3.

FIG. 3 is a characteristic diagram showing a relationship between the solenoid driving force F of the solenoid coil 15 and the stroke S of the valve member 2 in accordance with changes in a driving current I.

Note that the left edge position shown in FIG. 3 is determined as a position at which the stroke S is zero, and the stroke amount becomes larger toward the right side.

If the driving current I provided to the solenoid coil 15 is small, the solenoid driving force F is also small. The solenoid driving force becomes relatively larger accompanying the increase in the current.

On the other hand, the relationship between the stroke position and the solenoid driving force F approaches substantially flat characteristics for an identical driving current I. However, the solenoid driving force F is set so as to gradually become smaller as the amount of stroke of the valve member 2 approaches zero, that is, as the valve portion 2a approaches the valve seat 16. This kind of setting can be achieved by regulating the shape of a suction portion, as discussed later.

The stroke position of the valve member 2 is determined based on mainly the differential force between the springs 13 and 14 with respect to a given solenoid driving force F, as described above. The differential force between the springs 13 and 14 changes in accordance with the amount of stroke of the valve member 2. The differential force is the smallest in an initial state when current does not flow in the solenoid coil 15 (when the stroke is the largest), and is the largest when the valve stroke is zero (S=0) and the amount of deformation is the largest.

It is therefore necessary to increase the driving current of the solenoid coil 15 so that the solenoid driving force F becomes larger against the spring differential force, in order to displace the valve member 2 from the initial state toward the stroke S=0 and to make the area Av of the opening small.

A adsorbing force of the valve apparatus will generally become larger if a driving current to the solenoid coil is made large. The suction force also changes in accordance with distance from the adsorption portion, that is, in accordance with the valve stroke. If the suction force changes in accordance with the valve stroke position, the suction force of the valve apparatus by an identical current will fluctuate due to the stroke position. This is not preferable for an electromagnetic proportional flow rate control valve in terms of control.

Therefore, the shape of the suction portion is being changed conventionally so that the suction force acting on the valve apparatus by the solenoid coil does not change, even if the valve stoke position differs.

The characteristics shown by dashed lines of FIG. 3 show this. For an identical current, the solenoid driving force F does not change even if the stroke S differs, and an identical value may be maintained.

However, the relationship between the solenoid driving force F and the stroke S is set to have flat characteristics over all stroke regions. Therefore, as can be seen from the dashed line of FIG. 4, which shows the relationship between the driving current and the solenoid driving force, the solenoid driving force F changes sharply in a region where the driving current I becomes larger, that is, a region where the area of the valve opening is small, even if the current value only changes slightly.

This is because the solenoid driving force is proportional to the square of the driving current value, and therefore an extent of change in the solenoid driving force with respect to unit changes in the current value becomes larger in the region where the driving current Is large.

Figure 5:
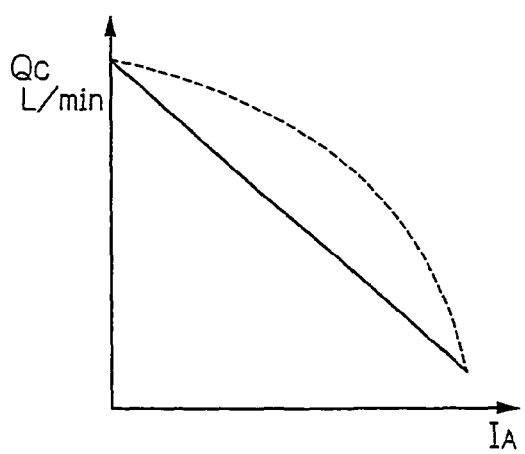
FIG. 5 is a characteristic diagram showing a relationship between a driving current and a control flow rate according to the present invention.

Similarly, regarding the relationship between the driving current I of the solenoid coil 15 and the control flow rate Qc, shown in FIG. 5, the area of the valve opening becomes sharply smaller with respect to the change in the current, and the control flow rate Qc is also reduced sharply, in the region where the current I becomes larger, as shown by the dashed line characteristic of FIG. 5.

A large flow rate fluctuation thus develops due to a slight current fluctuation in the low flow rate region, and the electromagnetic proportional flow rate control valve cannot perform the control with precision.

In contrast, in this invention, the relationship between the stroke S and the solenoid driving force F for an identical driving current I is substantially flat in principle, as described above. However, the relation therebetween is set so that the driving force F is gradually reduced in accordance with the reduction in the stroke S (the reduction in the area Av of the valve opening).

The extent of change in the solenoid driving force F with respect to changes in an identical driving current therefore becomes small in a region where the stroke S is small. As a result, the degree of the reduction in the area of the valve opening is suppressed compared to the case of having the flat characteristics described above. That is, the amount of change in the area of the valve opening with respect to unit changes in the driving current I becomes smaller in the region where the stroke is small compared to the case of having the flat characteristics.

Figure 4:
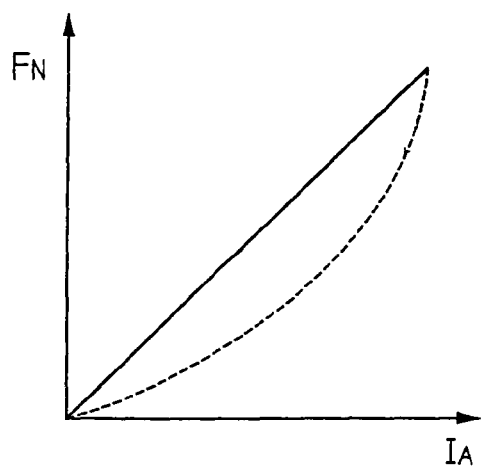
FIG. 4 is a characteristic diagram showing a relationship between a driving current and the solenoid driving force according to the present invention.

The relationship between the driving current I and the solenoid driving force F is therefore linearly proportional, as shown by the characteristics indicated by the solid line in FIG. 4. In particular, there are no sharp fluctuations in the driving force F due to slight current fluctuations in the region where the current value becomes larger.

Therefore, the relationship between the driving current I and the control flow rate Qc maintains a proportional relationship, and there is no large fluctuation in the flow rate due to a slight change in the current, even in a region where the driving current I becomes larger, the stroke amount approaches zero, and the area Av of the opening of the variable orifice 22 is small, as shown by the characteristics indicated by the solid line in FIG. 5.

With this, the flow rate control precision can be made high in the low flow rate region, and the electromagnetic proportional flow rate control valve 32 can accurately control the minute flow rate in accordance with changes in the driving current I. As a result, control of a fine assisting force of the power steering system 36 becomes possible, thereby obtaining a suitable rigid steering feeling capable of keeping the steering wheel in the neutral position, which leads to an improvement in the steering feeling.

The relationship between the stroke S and the solenoid driving force F becomes substantially flat characteristics with respect to the stroke changes for the identical driving current I, as shown by the solid line in FIG. 3. The driving force F can be made to gradually reduce in accordance with the reduction in the stroke S by changing the shape of the adsorption portion of the valve member 2.

Note that it is conventionally known that the shape of the suction portion of the valve member may be changed in order to obtain a constant driving force F over all stroke regions for the identical driving current I. The relationship between the stroke S and the driving force F can be freely changed by the shape of the adsorption portion. However, establishing a relationship in which the driving force F is gradually reduced in the stroke region where the area Av of the valve opening becomes small, has not been conventionally performed.

Specifically, in order to establish the relationship described above, in the present invention, such a structure is taken in which a concave portion 1a used for magnetic field regulation, depressed into an annular shape, is formed in a position extending to the inner circumferential step portion 3 in the inner circumferential surface 5, mutually opposed to the valve member 2 of the valve body 1, which structures a magnetic circuit with the movable core 6, and an inner diameter d of the concave portion 1a used for magnetic field regulation is larger than the inner diameter of the inner circumferential surface 5 of the tip of the valve member (left side in the figure).

In addition to this structure, a tapered portion 1b used for magnetic field regulation may also be formed in an annular edge surface, mutually opposing the sleeve 10 of the valve body 1 with a predetermined gap therebetween. An angle of inclination θ of the tapered portion 1b may be suitably set.

Note that, in addition to selectively forming the concave portion 1a used for magnetic field regulation or the tapered portion 1b used for magnetic field regulation, both portions may also be formed.

As described above, the characteristics of the solenoid driving force F shown in FIG. 3 can be obtained by arbitrary setting the values of the inner diameter d of the concave portion 1a used for magnetic field regulation, the tapered portion 1b used for magnetic field regulation, and the inclination angle θ.

In this case, in order to obtain the characteristics of the control flow rate Qc shown by the solid line of FIG. 5, the valve portion 2a of the valve member 2 is formed in a conic shape. As the valve member 2 is displaced in the leftward direction in FIG. 2 in association with an increase in the driving current I, the area Av of the opening of the variable orifice 22, defined by the valve portion 2a and the valve seat 16, becomes smaller in linear proportion.

From the above results, in the present invention, an effect can be attained, in which the flow rate control precision with respect to the driving current I can be increased in the region where the opening degree of the electromagnetic proportional flow rate control valve is small.

Figure 6:
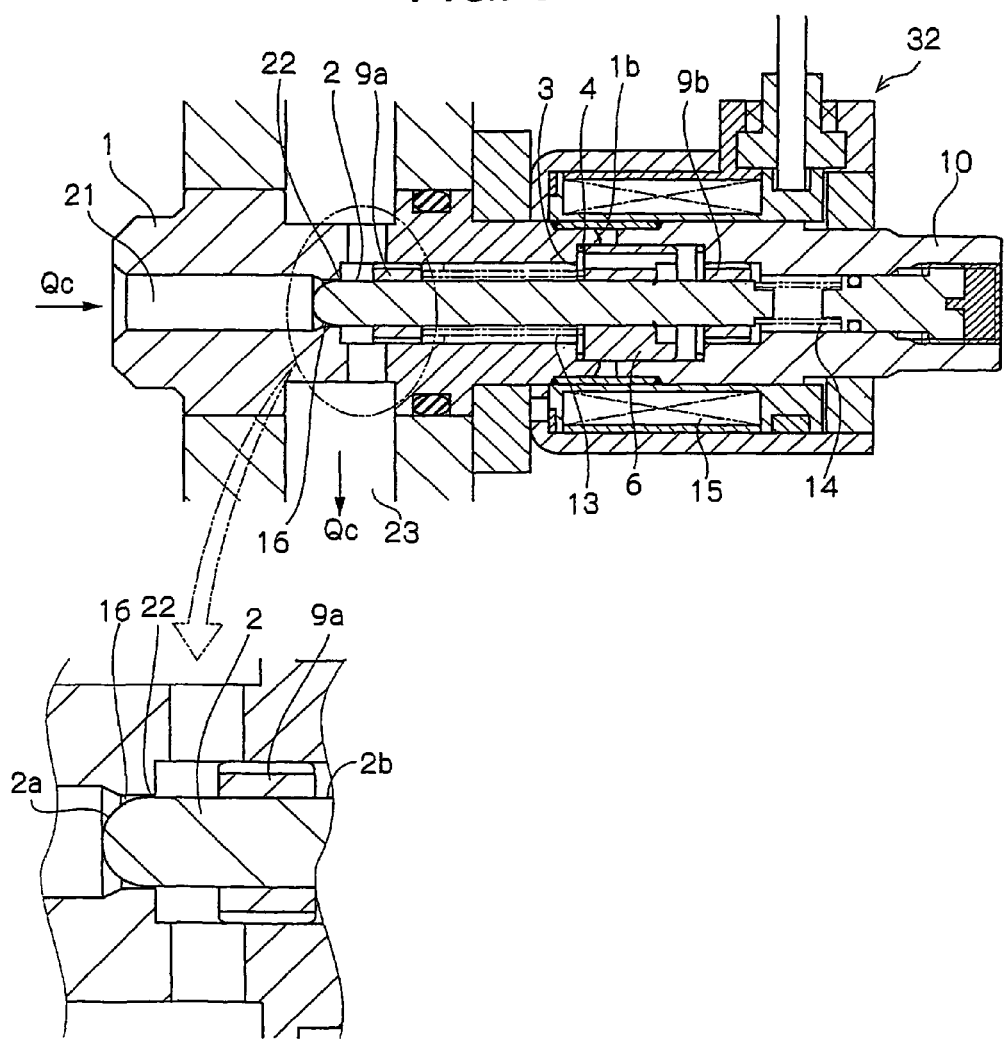
FIG. 6 is a cross sectional view showing an electromagnetic proportional flow rate control valve in accordance with another embodiment of this invention.

An embodiment of this invention shown in FIG. 6 is explained next.

The valve member 2a is formed having a substantially spherical shape at the tip of the valve member 2. The valve portion 2a is inserted into the valve seat 16, and the variable orifice 22, defined by the valve portion 2a and the valve seat 16 is formed. The area Av of the opening of the variable orifice 22 increases or decreases accompanying displacement of the valve member 2 in an axial direction.

The structure is employed such that the valve portion 2a is formed into a substantially spherical shape, and the proportion of reduction in the area of the opening of the variable orifice 22 gradually becomes smaller with respect to the stroke of the valve member 2 as the valve member 2 approaches the valve seat 16.

A cross section of the valve portion 2a is formed into a substantially semi-circular shape, and the valve portion 2a is made continuous with the outer circumferential surface 2b of the valve member 2 without a step.

Figure 7:
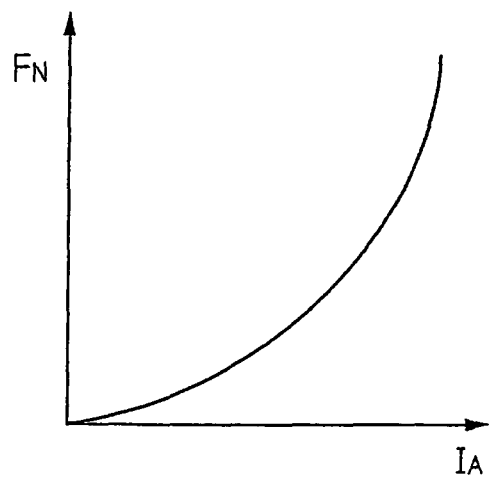
FIG. 7 is a characteristic diagram showing a relationship between a driving current and a solenoid driving force in accordance with another embodiment of this invention.

The characteristic of the relationship between the driving current I of the solenoid coil 15 and the solenoid driving force F in this case is one in which the solenoid driving force F increases sharply accompanying the increase in current in a region, where the driving current I flowing in the solenoid coil is large, as shown in FIG. 7.

As a countermeasure for this, the valve portion 2a is formed into a substantially spherical shape, and a structure is employed, in which the proportion of the reduction in the area Av of the opening of the variable orifice 22 with respect to the stroke of the valve member 2 gradually becomes smaller as the valve member 2 approaches the valve seat 16, thereby precise flow rate control becomes possible on the low flow rate side of the operating region.

Figure 8:
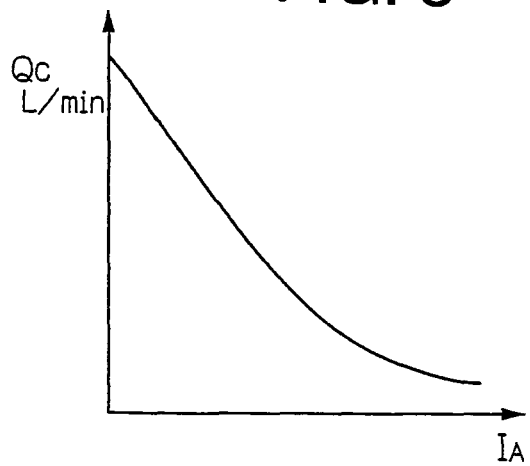
FIG. 8 is a characteristic diagram showing a relationship between the driving current and a control flow rate in accordance with another embodiment of this invention.

FIG. 8 is a characteristic diagram showing the relationship between the driving current I of the solenoid coil 15 and the control flow rate Qc. The control flow rate Qc is gently reduced accompanying the increase in the driving current I flowing in the solenoid coil 15. That is, although the control flow rate Qc is reduced in linear proportion accompanying the increase in the driving current I on the high flow rate side of the operating region, the extent of the reduction in the control flow rate Qc gradually drops accompanying the increase in the driving current I on the low flow rate side of the operating region.

While the flow rate increases and decreases in linear proportion to the driving current I on the large flow rate side of the operating region, and the flow rate control response characteristic is increased, flow rate fluctuations are finely controlled in accordance with the driving current I on the low flow rate side of the operating region. As a result, fine assisting force control of the power steering system 36 becomes possible, thereby obtaining a suitable rigid steering feeling for maintaining neutral steering position, which leads to an improvement in the steering feeling.

Note that the cross sectional shape of the valve portion 2a is not limited to a substantially semi-circular shape as in the embodiment described above. An approximately elliptical shape may also be used, and a cross section having a substantially triangular tapered shape may be combined at its tip end side thereof.

This invention is not limited to the electromagnetic proportional flow rate control valve used for the power steering apparatuses as described in the above-mentioned embodiments. This invention may also be applied to an electromagnetic proportional flow rate control valve used for an industrial machine or the like, and it is clear that various modifications are possible within the scope of the technical concept of the invention.

INDUSTRIAL APPLICABILITY

This invention can be applied to an electromagnetic proportional flow rate control valve used for power steering apparatuses, industrial machines, or the like.

The invention claimed is:

1. An electromagnetic proportional flow rate control valve, comprising:
   a valve body;
   a valve member;
   a movable core fixed to the valve member and guided so as to slide freely within the valve body;
   a spring configured to drive the valve member in a valve opening direction; and
   a solenoid coil configured to directly drive the movable core, and hence drive the valve member, in a valve closing direction in accordance with an increase in a driving current of the solenoid coil against a spring force of the spring, wherein
   a solenoid driving force itself is set such that an amount of change in a displacement of the valve member in the valve closing direction is reduced with respect to a unit change in the driving current in a region where a stroke of the valve member is short, and
   a cavity portion for magnetic field regulation, having an annular shape, is formed in an inner circumferential surface of the valve body, an inner diameter of the cavity portion is larger than an inner diameter of the inner circumferential surface of the valve body, which provides a magnetic circuit around the movable core, and the cavity portion is formed in a position extending to an inner circumferential step portion in the inner circumferential surface with which the movable core makes contact at a valve stroke end, wherein
   the cavity portion is configured to regulate the magnetic circuit generated by the solenoid coil for driving the movable core and to alter the solenoid driving force versus solenoid driving current curve, so as to reduce an amount of change of the solenoid driving force with respect to a unit change in the driving current in a region where a stroke of the valve member is short.

2. An electromagnetic proportional flow rate control valve according to claim 1, wherein an annular shape gap is formed in a portion of the valve body, which structures the magnetic circuit around the movable core; and a tapered portion for magnetic field regulation is formed opposing the gap.

* * * * *